3,008,885
PREPARATION OF GRAFTED CELLULOSE-BASE COPOLYMERS
Pierre Talet, Paris, France, assignor to Societe Anonyme dite: Nobel-Bozel, Paris, France
No Drawing. Filed Apr. 16, 1958, Ser. No. 728,802
5 Claims. (Cl. 204—158)

This invention relates to methods of polymerization, copolymerization and graft-polymerization, of the type involving radio-chemical technique, i.e. exposure to ionizing radiation.

It is now well known that such polymerization processes have certain outstanding advantages over more conventional methods such as those utilizing light rays (i.e. photopolymerization), cation and anion polymerization, and radical catalyst polymerization. However, complete polymerization by radiochemical methods usually requires prolonged exposure to the radiation, and this difficulty cannot generally be circumvented by simply increasing the intensity of the rays. It is therefore an object of this invention to reduce the minimum time of exposure to radiation required in order to complete polymerization, and thereby to increase the output rate of polymerization processes of the type specified.

Another object is to improve the mechanical and physical characteristics of the resulting polymer compositions, and specifically to achieve such improvement by introducing a controlled degree of reticulation in the polymers obtained.

The invention is based on the unexpected finding that the rate of ionization-polymerizing can be materially increased, and at the same time reticulation in the polymer can be promoted, by adding a small quantity of hexahydro-1,3,5-triacrylyl-s-triazine into the mass undergoing polymerization.

The invention therefore essentially is directed to a radio-chemical polymerization process wherein hexahydro-1,3,5-triacrylyl-s-triazine is incorporated in the reagent mass. The proportion of the said addition is not critical. However, a preferred range of proportions, by weight, can be indicated as extending from one millionth part triazine per part reagent mass, to as much as or more than 0.03 part triazine per part reagent mass; below the first above indicated figure the beneficial effect of the addition is too small to be of interest while above the second above figure the improvement is offset by the cost of the addition. Within the above broad range, the preferred amount of addition used should be determined with regard to the particular result desired in each individual instance.

Thus, in case, it is simply desired to activate polymerization by reducing the duration and/or dose of exposure to ionizing radiation, a preferred range of proportions of from about $10^{-6}$ to about $10^{-3}$ part triazine per part reagent mass, by weight. If on the other hand the foremost consideration is to achieve reticulation in the product polymer, a preferred range would be from about $10^{-3}$ to about $10^{-2}$.

The invention makes it possible to reduce by from 30% to 50% the dose of irradiation required for providing a given degree of polymerization over what is required in conventional processes. The following examples will illustrate the invention but are not to be construed as restricting its scope.

*Example 1*

In an enclosure permeable to the gamma radiations from a source of cobalt 60, a mixture having the following composition is introduced:

|  | Grams |
|---|---|
| Ethylcellulose containing 49% ethoxy groups | 200 |
| Distilled vinyl acetate | 100 |
| Allyl phthalate | 3 |
| Hexahydro-1,3,5-triacrylyl-s-triazine | 0.75 |

The mixture is placed in oxygen-free conditions. This can be achieved by degasifying the mixture and evacuating the container; or, if found more convenient, the container may simply be filled to such a degree that once hermetically sealed there is practically no air left in contact with the reagent mass.

The container is then exposed to 2 million roentgen radiations from the cobalt 60 source, and is then found to contain a yellowish solid product which is moldable at 150° C. to provide moldings of a brownish color.

When an identical procedure is followed while omitting the triazine compound from the mixture, it is found that the exposure must be increased to 3 million roentgens in order to achieve similar results.

*Example 2*

In the same reactor as in Example 1 the following charge is introduced:

|  | Parts by weight |
|---|---|
| Cellulose diacetate | 1 |
| Distilled allyl phthalate | 6.6 |
| Hexahydro-1,3,5-triacrylyl-s-triazine | 0.038 |

The treatment is arrested when the dose of radiation absorbed has attained 350,000 roentgens. The resulting composition can be pressure-injected at a temperature of 170° C. and yields moldings which do not lose shape on exposure to 120° C. in an oven.

Under identical test conditions but using a mixture from which the triazine was omitted it was found necessary to increase the exposure to 700,000 roentgens for similar results.

*Example 3*

Using the same reactor the following charge was treated:

|  | Grams |
|---|---|
| Cellulose diacetate | 60 |
| Vinyl acetate | 400 |
| Allyl phthalate | 1.5 |
| Hexahydro-1,3,5-triacrylyl-s-triazine | 2 |

After exposure to 400,000 roentgens the mass is removed from the reactor and is injection-molded. It is found that the mass rather than being extruded as a continuous ribbon or strip issues in the form of a powder. A similar result is obtained when a composition similar to that above but lacking the triazine constituent is exposed to one million roentgen radiations.

*Example 4*

Using the same reactor as before, the following composition is treated:

|  | Grams |
|---|---|
| Cellulose diacetate | 90 |
| Vinyl acetate | 300 |
| Phenyl salicytate | 3 |
| Hexahydro-1,3,5-triacrylyl-s-triazine | 0.1 |

On exposure to 350,000 roentgens, a mass is obtained which is moldable at a temperature of 120° C. If the same mixture as above but lacking the triazine constituent is used it is found necessary to increase the total exposure to 600,000 roentgens in order to obtain comparable results.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a method of polymerizing a mixture of a cellulose compound with at least one polymerizable monomer, said method including the step of exposing said mixture to high energy, ionizing radiation of from 350,000 to 2,000,000 roentgens, the improvement consisting of incorporating hexahydro-1,3-5-triacrylyl-s-triazine in said mixture prior to exposure, in a proportion within a range of from about $10^{-6}$ to about $3 \times 10^{-2}$ part triazine per part of said mixture, by weight.

2. In a method of polymerizing a mixture of a cellulose compound with at least one polymerizable monomer, said method including the step of exposing said mixture to high energy, ionizing radiation of from 350,000 to 2,000,000 roentgens, the improvement consisting of incorporating hexahydro-1,3,5-triacrylyl-s-triazine in said mixture prior to exposure, in a proportion within a range of from about $10^{-6}$ to about $10^{-3}$ part triazine per part of said mixture, by weight, thereby to reduce the time of said exposure required to achieve a given degree of polymerization.

3. In a method of polymerizing a mixture of a cellulose compound with at least one polymerizable monomer, said method including the step of exposing said mixture to high energy, ionizing radiation of from 350,000 to 2,000,000 roentgens, the improvement consisting of incorporating hexahydro-1,3,5-triacrylyl-s-triazine in said mixture prior to exposure, in a proportion within a range of from about $10^{-3}$ to about $3 \times 10^{-2}$ part triazine per part of said mixture, by weight, thereby to promote reticulation in said polymer.

4. The method of polymerizing a mixture of a cellulose compound with a plurality of polymerizable monomers, the improvement consisting of exposing said mixture to high energy, ionizing radiation of from 350,000 to 2,000,000 roentgens, and incorporating hexahydro-1,3,5-triacrylyl-s-triazine in said mixture prior to said exposure in a proportion within a range from about $10^{-6}$ to about $3 \times 10^{-2}$ parts triazine per part of said mixture, by weight.

5. As a new composition of matter, a polymer composition produced by the method of claim 1.

References Cited in the file of this patent

FOREIGN PATENTS 714,843　　Great Britain _____ Sept. 1, 1954

OTHER REFERENCES

Bovey: "Effects of Ionizing Radiation on Natural and Synthetic High Polymers," pp. 190–196.